United States Patent
Maltby et al.

(10) Patent No.: US 6,202,100 B1
(45) Date of Patent: Mar. 13, 2001

(54) OBJECT LINKING AND EMBEDDING OVER A COMPUTER NETWORK

(75) Inventors: John Maltby, Emsworth; Simon Phipps, Southampton; Vince Singleton, Northants, all of (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/395,548

(22) Filed: Feb. 28, 1995

(30) Foreign Application Priority Data

Mar. 23, 1994 (GB) .................................. 9405757

(51) Int. Cl.$^7$ ....................................... G06F 9/00

(52) U.S. Cl. ................................................ 709/329

(58) Field of Search .................. 395/650, 700; 709/329, 310–332

(56) References Cited

U.S. PATENT DOCUMENTS

| | | | |
|---|---|---|---|
| 5,408,470 | * 4/1995 | Rothrock et al. | 370/261 |
| 5,446,896 | * 8/1995 | Hegarty et al. | 707/1 |
| 5,452,299 | * 9/1995 | Thessin et al. | 370/260 |

FOREIGN PATENT DOCUMENTS

| | | | |
|---|---|---|---|
| 0380211 | 1/1989 | (EP) | G06F/9/46 |
| 0474339 | * 11/1992 | (EP) | G06F/9/44 |

OTHER PUBLICATIONS

(no author given) "Object Linking & Embedding", Microsoft Corp. pp. 1–45, Nov. 6, 1991.*

William, Semich, J., "Uncertain Future: What's the Next Step After Client/Server?", Datamation, v40, n6, p. 26(7), Mar. 1994.*

Brockschmidt, Kraig, "Introducing OlE 2.0, Part I: Windows Objects and the Component . . . ", Microsoft Systems Journal, v8 n8 p. 15(9), Aug. 1993.*

(no author given), "Microsoft mulls OMG compliance for Cairo", PC Week, v10, n42, p. 3(1), Oct. 1993.*

Orfali, Robert, Dan Harkey, "Client/Server Survival Guide with OS/2", Van Nostrand Reinhold, pp. 745–753, 1994.*

Powell. James E., "HiJaak 1.0", Windows Magazine, 1992, n. 311 p. 310, Dec. 1992.*

Microsoft Visual C++ Programmer's Guides 1993 pp. 273–Ch. 18 Ole Support.*

Welch, Kevin P. "Inter Program Communications Using Windows' Dynamic Data Exchange" Microsoft Systems Journal Nov. 1987.*

* cited by examiner

*Primary Examiner*—St. John Courtenay, III
(74) *Attorney, Agent, or Firm*—Jeanine S. Ray-Yarletts

(57) ABSTRACT

A user at computer A submits material from an application APPN A onto the clipboard at that machine. A routine CLIP SEND, part of conferencing software P2P-A at computer A obtains a list of available formats for the material on the clipboard, and transmits this list to a second machine, computer B. This list is received by conferencing software P2P-B at computer B, and a routine CLIP RECEIVE, part of P2P-B, submits the list to the clipboard at that machine. The user at machine B can then embed an object originally from APPN A by OLE pasting into an application at computer B, APPN B. in the normal manner.

10 Claims, 3 Drawing Sheets

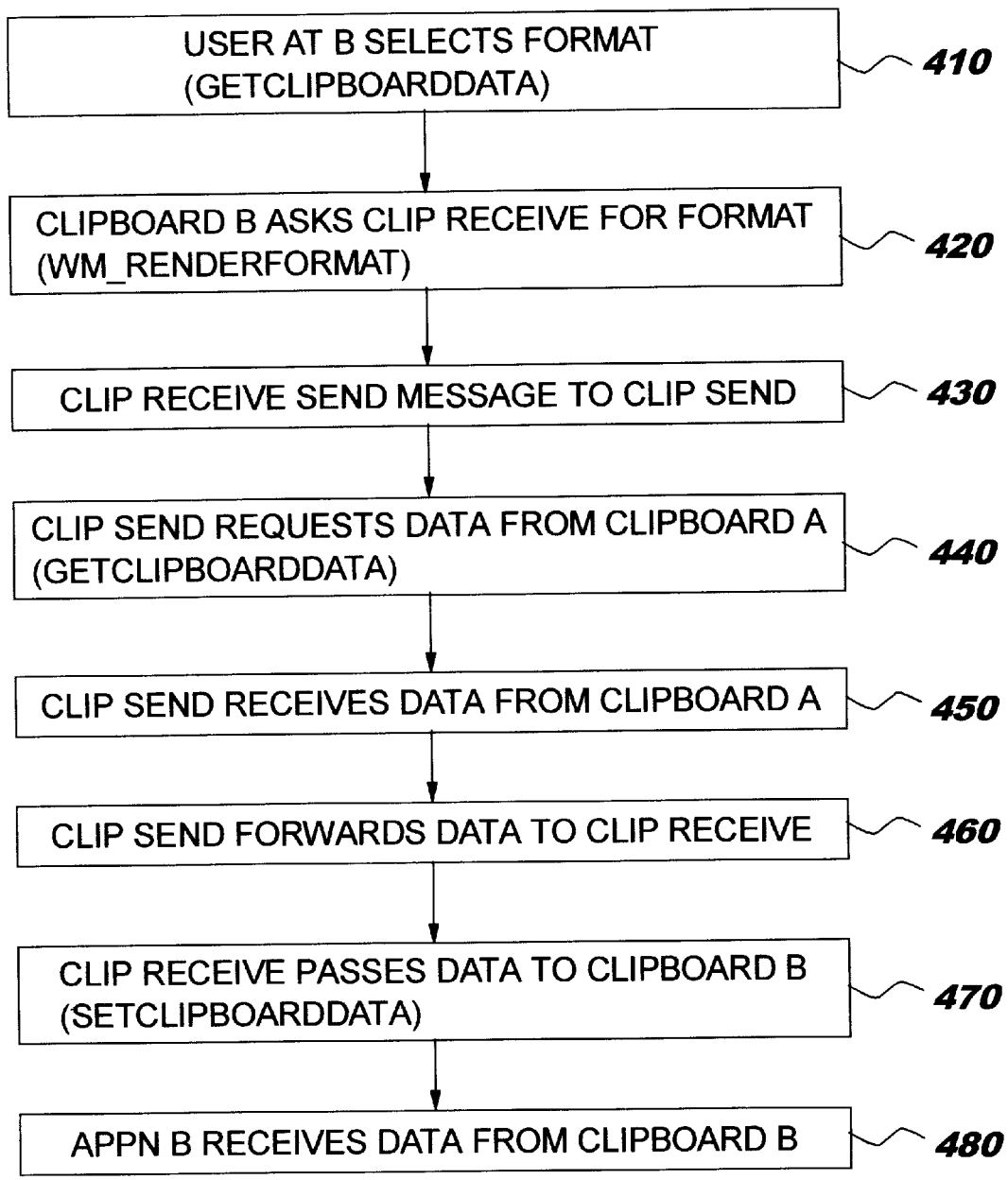

OBJECT LINKING AND EMBEDDING OVER A COMPUTER NETWORK

Related applications: Background information useful for an understanding of the present invention may be found in U.S. patent application Ser. Nos. 08/149,487 and 08/203,067 filed on Nov. 9, 1993 and Feb. 28, 1994 respectively in the name of IBM Corporation, which are incorporated herein by reference. Copies of these two applications are filed with this application.

The present invention relates to a method of providing object linking and embedding (OLE) over a computer network, in which an object from a first application at a first computer in the network is incorporated into a second application at a second computer in the network.

A personal computer running a multi-tasking operating system such as OS/2 or Windows[1] can support more than one application running simultaneously. It is sometimes necessary for a user to be able to copy data from one application to another, for example to copy numbers from a spreadsheet into a report being prepared on a wordprocessor. One way of performing this transfer is to write the data from the first application into a file on the hard disk, and then retrieve the file into the second application. This is simple but relatively cumbersome.

[1]OS/2 is a trademark of International Business Machines Corporation and Windows is a trademark of Microsoft Corporation The OS/2 and Windows operating systems provide a more sophisticated facility, known as the clipboard, for performing such an operation. Applications copy data onto the clipboard (effectively a piece of memory which they then surrender to the operating system). Another application can then interrogate the operating system to find out what is available on the clipboard, and if desired take a copy of the data from the clipboard. Normally an application will write the data into the clipboard in several different formats, and the receiving application will then specify in which of these data formats it would like to receive the data. There are several standard formats, which are available for all applications to use. The clipboard can be used for exchanging text, images, and so on.

One slight complication is that the clipboard supports delayed rendering. In this case, the data itself is not supplied to the clipboard for a particular format, rather only a reference to the data. The data itself is supplied by the originating application only when that particular format is requested by another application. It is possible to use delayed rendering for some, all or none of the formats for any particular piece of data posted to the clipboard.

A typical situation in which a user might employ the clipboard function would be to copy a portion of text from one document to another. The user (generally with a mouse and cursor) would first identify the text to be copied from the first (server) application, and then select the appropriate menu option to place this text in the clipboard. The application would then pass the text to the operating system in a variety of formats—for example, as a text file, as a bit map, as a metafile, as a miniature document complete with format information, and so on. The operating system specifies a list of common predetermined formats, but it is also possible for the application to use its own particular or private format. The formats are normally listed in order of preference, the most preferred format being that which preserves most information from the server about appearance etc (eg ASCII text might be the least preferred format, since it contains no formatting information at all). The user in another (client) application can then request that the text/data is retrieved from the clipboard. Such a request results in the application being asked to select one of the available formats. The application may decide automatically which format to take (perhaps it can only accept a particular format), or it may pass this choice on to the user; typically the most preferred format recognised by the client application would be accepted.

An application can request (via an operating system call) to become the owner or viewer of the clipboard. Becoming the owner is necessary for delayed rendering for the application to receive notification whenever text/data is requested from the clipboard. Becoming a viewer of the clipboard results in the application receiving notification whenever another application writes something to the clipboard.

The clipboard is well-suited to one-off transfers. However, if a particular piece of data in the first application is updated regularly, and each of these updates is to be copied across to the second application, then repeated use of the clipboard becomes tedious and awkward. This problem is addressed by the provision in OS/2 and Windows of an additional function, termed dynamic data exchange (DDE). In DDE a link is set up to copy data from a first application (the server) to a second application (the client). As the name implies the link is dynamic, in that for as long the link is maintained, modifications to the selected entry in the server application are automatically copied to the client application. In other words, the client contains a shadow or mirror of the data in the server.

An application in OS/2 or Windows can initiate DDE by one of two methods. In the first (which in practice is hardly ever used) an application broadcasts an INITIATE message to other applications executing on the node. The message contains the following information: Application Name, Topic, Item, in an ASCII text string, using zeroes as delimiters. The first of these is used to identify the originating application, the topic is then used to specify some particular data file or whatever, whilst the item indicates a position within the data file. For example, a spreadsheet program would give the spreadsheet name as the topic and perhaps use "R1C1" as the item to identify the data cell in the first row and in the first column. Applications receiving the message that wish to participate in DDE with the originating node respond positively, and a DDE conversation can then be set up.

The second method, which has become the de facto standard, is to initiate DDE via the clipboard. When a piece of data is copied to the clipboard, one of the formats used is a private format representative of DDE (under Microsoft Windows conventionally this private format is "Link"). The data stored with this private format is in fact the Application, Topic, and Item parameters described above. When the user retrieves this data into the second (client) application, this private format is indicated as providing DDE. When this option is selected, the client application responds requesting the start of DDE. This response is actually performed by broadcasting a message including the application and topic which is recognised by the originating server, leading to the commencement of the DDE conversation. Note that the conversation actually occurs between two windows, one belonging to the server and one belonging to the client. These are accessed by identifiers known as window handles.

The user can therefore initiate a DDE connection between the server application and the client. At the start of this DDE conversation, the server and client negotiate regarding the data format to use for data transfer between them. Obviously for DDE to work the client and server must be compatible, to the extent that the client recognises the private format placed on the clipboard by the server as an invitation to DDE and they support at least one data format in common.

Another approach to the transfer of data between applications is provided in Microsoft Windows and is termed Object Linking and Embedding (OLE). OLE is somewhat similar to a standard clipboard transfer between applications, except that instead of transferring the data as a bit map, text string or whatever, the data is transferred as an object. In OLE a selected piece of data (an object), is cut from a first application (the source or server) and added to the clipboard in normal fashion. Private formats are used to indicate that Object Linking and/or Object Embedding are available (OLE actually represents two separate facilities); the data associated with these formats specifies the (server) application name and topic and item in the same format used for DDE. In Object Embedding the data is also added to the clipboard in a so-called "native" format, which contains all the information needed to allow the source application to further process the data. If either OLE format is selected from a second application (the client or target), the object is pasted into the second application. At this stage the pasted material is visible as if a normal clipboard transfer had been performed: this is achieved by also copying another suitable format from the clipboard to allow display of the data (typically this is the format that would have been adopted had OLE not been invoked). However, the object that has been incorporated into the target application contains extra information over and above the bit map, text, or whatever representing the appearance of the object: it also contains the name (at least) of the original source application, plus (for Object Embedding) a native format including all the original control information held by the server application about that object. The object therefore contains sufficient information to identify and be further processed by the server application. In Microsoft Windows it is subsequently possible by double clicking on the object as seen from the target application to launch the server application and use it to process the object. This is effected by the client application sending an appropriate request to the Microsoft Windows operating system.

An example of the use of OLE would be if a drawing application is used to create a graph (ie the object), which is then incorporated using OLE into a word processor document. If it is subsequently decided to update the graph, there is no need to repeat this process (ie update the graph in the drawing application and then copy it across again into the word processor document); rather double clicking on the graph in the document launches the drawing application, which can then be used to update the graph directly. Thus it will be seen that OLE, unlike the normal clipboard or DDE, allows pasted material to be updated from within the target application, and at some arbitrary future date (DDE, by contrast only operates whilst the link between the two applications is maintained, and even then only allows updating from within the server application).

In Object Linking the object contains a reference back to the original file containing the relevant data (including disk drive, filename etc); thus any updates made to the original file are reflected in the object as viewed from the client application. In Object Embedding by contrast, effectively a copy is made of the original data, so that it does not mirror updates to the source data. Thus it can be seen that Object Linking and Object Embedding, although closely related, differ somewhat in the precise details of their operation.

Further information about OLE under Microsoft Windows can be found in "Object linking and Embedding: Programmer's Reference, Version 1", Microsoft Press, 1992.

To date, OLE has essentially been directed at transferring data between two applications both running on a single machine, although some commercially available products do have a limited ability to perform OLE across a network. For example, the Microsoft Windows for Workgroups product supports OLE across two or more machines; however, the Windows for Workgroups operating system is specifically designed for use over a network. In a sense it can be regarded as a single system distributed over multiple hardware systems (which must be connected together by a local area network (LAN)). Only systems running Windows for Workgroups can use this network OLE; there is no mechanism for supporting OLE between machines with other operating systems.

Another product, ProShare from Intel Corporation, also provides a limited form of OLE over a network. This product permits sharing of data from one node to another; ie material entered into the application at one node is mirrored at the other node. This product supports OLE, so that if an object is embedded into the application at one node, it likewise appears embedded at the other node. This facility however is only useful for providing OLE within this one application; it is not possible to provide OLE between an arbitrary application on a first machine and an arbitrary application on a second machine.

Thus it will be seen that although the prior art has addressed the problem of OLE over a network to a limited extent, it has not provided a comprehensive solution that is both flexible and relevant to existing applications.

Accordingly, the invention provides a method of providing object linking and embedding (OLE) over a computer network, in which an object generated by a first application at a first computer in the network may be incorporated into a second application at a second computer in the network, said first and second computers each running a stand-alone operating system supporting a clipboard, the method comprising the steps of:

receiving notification that the first application has submitted material to the clipboard on the first computer and obtaining a list of available formats for said submitted material;

transmitting the format(s) corresponding to Object Embedding to the second computer;

submitting the format(s) corresponding to Object Embedding to the clipboard at the second computer for selection by the second application.

Once the appropriate format(s) for Object Embedding have been submitted to the clipboard at the second computer, the object is available to be incorporated into the second application in the normal manner, by selecting OLE from the clipboard. Subsequently, when the object is invoked by double clicking, the operating system at the second computer will look for an application having the same name as the first application, but residing on the second computer. This application will then be launched to allow the object to be processed as per normal OLE. In the present invention the cross-network nature of the OLE is completely transparent to the applications and no special operating systems are required.

Clearly it is necessary as described above for the second computer also to possess a copy of the first application that exists at the first computer. In practice this will normally be the case; in many organisations, standard software packages are available to all users, for example because they are installed onto a local area network (LAN). It is not at present supported for double clicking in the second application at the second computer to result in the first application at the first computer being remotely launched to process the object. The reason for this is that the operating system at the second computer could not successfully resolve the reference to the first application on the first computer when the object was invoked. Of course, future operating systems may be able to handle such references, or alternatively an application on the second computer could be used to act as an intermediary between the first application on the first computer and the operating system on the second computer. However, this latter suggestion is not straightforward and has yet to be implemented.

To support OLE over a network, it is only necessary to submit the actual format(s) required for OLE to the clipboard at the second computer. In Microsoft Windows applications the availability of OLE is conventionally signalled by a format named "OwnerLink". It may be desired to pick out just this format from the clipboard at the first computer, plus formats for the native and presentation data, and then send them to the second computer (this approach minimises the size of transmissions between the two computers). However, in a preferred embodiment, the list of all the available formats for the material submitted to the clipboard is transmitted to the second computer for submission to the clipboard at the second computer. This effectively allows applications on the first and second computers to transparently share a single clipboard, as described in more detail in the afore-mentioned U.S. application Ser. No. 08/149,487.

If the whole list is transferred, it is preferred that the method further includes the step of detecting if one of the available formats corresponds to Object Linking. In Microsoft Windows applications such a format is conventionally named "ObjectLink". If such a format is present, it is not submitted to the clipboard at the second computer (eg by removing it from the list prior to transmission to the second computer, or at the second computer before submission to the clipboard). Effectively this prevents Object Linking being performed over the network. Again, the reason for this is that the operating system at the second computer could not successfully resolve the reference to the original data file on the first computer when the object was invoked. Of course, future operating systems may be able to handle such references, or alternatively an application on the second computer could be used to act as an intermediary between the first application on the first computer and the operating system on the second computer. However, this latter suggestion is not straightforward and has yet to be implemented.

Preferably a check is made to see if one of the available formats corresponds to dynamic data exchange (DDE). In Microsoft Windows applications such a format is conventionally named "Link". If this format is present, the data associated with the format is changed by replacing the application name therein (ie denoting the first application) with a name containing an identifier of the first computer. The replacement name refers to a substitute application on the second computer, which picks up any DDE requests and refers them back to first computer, as described in the afore-mentioned U.S. application Ser. No. 08/203,067.

Note that a slight complication to the above is that it appears that in reality not all Microsoft Windows applications adhere fully to the format naming conventions; some use "ObjectLink" to denote a DDE link. Thus it may be more effective in some cases to regard "ObjectLink" as denoting DDE and to process it accordingly, rather than to drop it as denoting Object Linking.

Preferably the formats are submitted to the clipboard on the second computer using delayed rendering, and further comprising the steps of:

responsive to receiving a request from the second application for a copy of the clipboard material in a particular format, sending a corresponding request to the first computer;

obtaining the requested material from the clipboard at the first computer;

transmitting the requested material obtained from the clipboard on the first computer to the second computer;

and submitting the requested material to the clipboard on the second computer, for passing to the second application.

The advantage of using delayed rendering is that it avoids superfluous network traffic in relation to clipboard formats that are never actually requested. If material is submitted to the clipboard in the form of a bit map for example, this saving can be quite significant. In fact, the data associated with the OLE format per se is simply the string containing the application name, topic and item, and so the delayed rendering for this format does not save much bandwidth per se. Thus it would be quite feasible to send the data associated with OLE format (even if it was obtained from the clipboard on the first computer using delayed rendering) at the same time as the format itself, and submit both together to the clipboard on the second computer. However the presentation and native data associated with OLE may well be extensive, favoring the use of delayed rendering, which furthermore allows the same approach to be used for OLE as for all the other clipboard formats, including those such as bit map.

In a preferred embodiment, both first and second computers run conferencing applications, which are responsible for exchanging messages between the first and second computer. The conferencing applications are also responsible for interacting via the clipboard with the first and second applications at their respective computers; ie the conferencing application at the first computer obtains the list of available formats and then the associated data from the clipboard at the first computer, whilst the conferencing application at the second computer submits the list of available formats and then the associated data to the clipboard at the second computer.

A detailed description of an embodiment of the invention will now be provided by way of example, with reference to the following drawings:

FIG. 4 is a flow chart illustrating the processing of a request at the second machine for a clipboard entry from the first machine;

Figure 1:
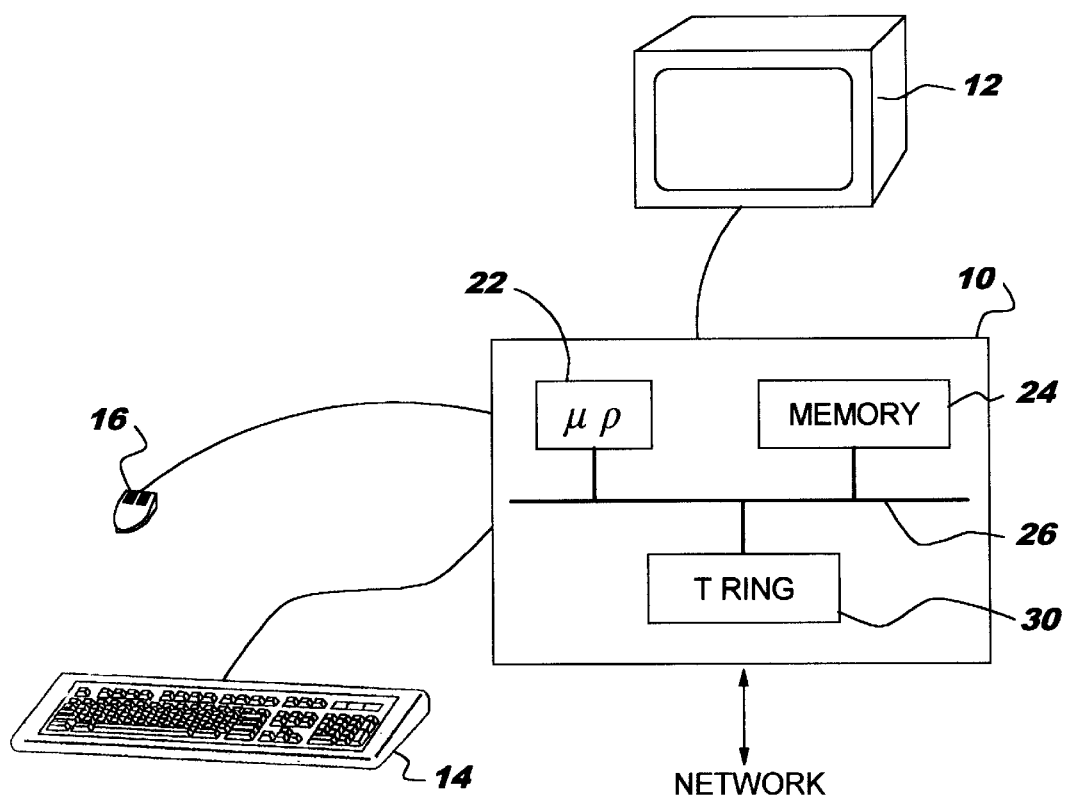
FIG. 1 is a schematic block diagram of a typical computer workstation.

FIG. 1 is a simplified schematic diagram of a computer system, with a system unit 10, a display screen 12, a keyboard 14 and a mouse 16. The system unit 10 includes microprocessor 22, semi-conductor memory (ROM/RAM) 24, and a bus over which data is transferred 26. The computer of FIG. 1 may be any conventional workstation, such as an IBM PS/1 computer. The computer of FIG. 1 is equipped with a network adapter card 30. This card, together with accompanying software, allows messages to be transmitted onto and received by the computer workstation.

Various forms of network adapter card are available for use with networks such as Token Ring, Ethernet, ISDN, and so on. The operation of the network adapter card is well-known and so will not be described in detail.

Figure 2:
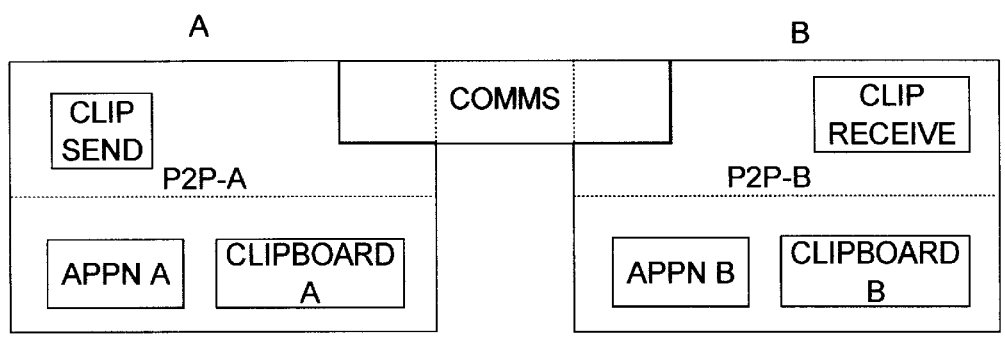
FIG. 2 is a simplified diagram of the major software components running on the workstation of FIG. 1.

FIG. 2 illustrates the main software components on two terminals A, B, necessary for an understanding of the invention. Both terminals A and B are typically workstations as shown in FIG. 1, and have clipboards ("CLIPBOARD A" and "CLIPBOARD B" respectively) supported by the operating system (eg Microsoft Windows) at the respective terminals. The two terminals are connected by a network link with appropriate communications software ("COMMS") at each terminal to provide data communications between terminal A and terminal B. Such communications software interfaces with the network adapter card and is again well-known in the art.

Terminals A and B also run conferencing software, which is responsible for implementing the OLE between the two terminals. This conferencing software is designated as P2P-A and P2P-B on terminals A and B respectively. P2P-A and P2P-B are simply additional applications as far as the operating system is concerned, although for present purposes they are perhaps most simply regarded as enhancements to the COMMS software. P2P-A and P2P-B interact with the COMMS software to exchange messages between terminals A and B using conventional communication protocols. The operation of P2P-A and P2P-B is described in more detail below. An example of commercially available suitable conferencing software is Person to Person[2] for Windows from IBM Corporation, which supports conferences between two or more people over a variety of communications links (eg LAN, ISDN, asynchronous).

[2]Person to Person is a trademark of International Business Machines Corporation An application program ("APPN A") and a routine ("CLIP SEND"), part of P2P-A, run on terminal A, with an application program ("APPN B") running on terminal B. CLIP SEND uses the COMMS system to send a message to terminal B to activate another routine ("CLIP RECEIVE"), part of P2P-B, at terminal B. CLIP SEND makes an operating system call to become a viewer of CLIPBOARD A in accordance with conventional clipboard manipulation. The user at terminal A selects the appropriate material from APPN A and copies this into CLIPBOARD A in the conventional manner. Because the CLIP SEND routine is a viewer of CLIPBOARD A, it is notified of any updates to CLIPBOARD A. When it is alerted to a change to CLIPBOARD A, it requests the list of available formats which it sends to CLIP RECEIVE. CLIP RECEIVE now takes ownership of CLIPBOARD B and inserts the list of formats using delayed rendering (ie it passes a null pointer to the operating system). This avoids the bandwidth overheads associated with sending the actual data itself. The contents of CLIPBOARD A are thus reproduced on CLIPBOARD B.

Figure 3:
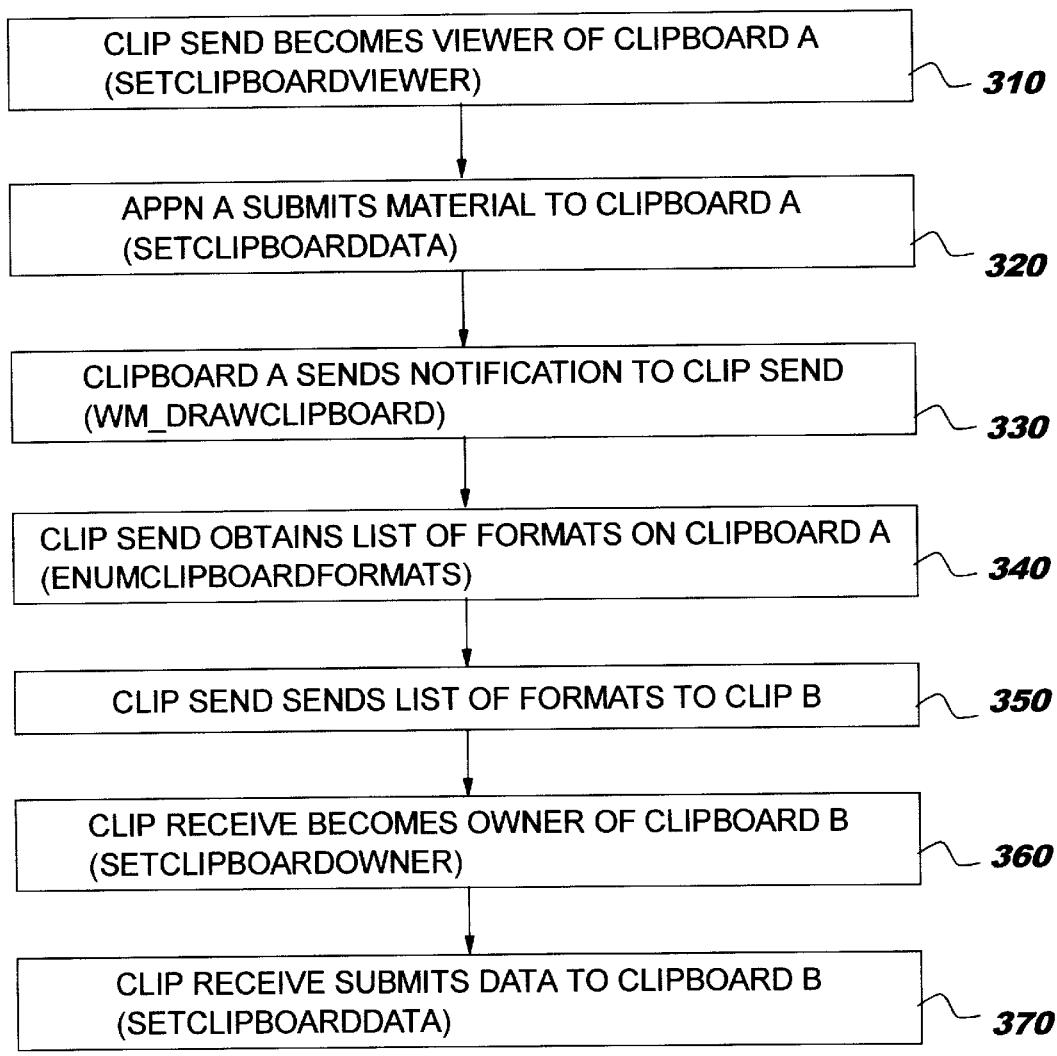
FIG. 3 is a flow chart illustrating the process for copying a clipboard entry at a first machine to the clipboard at a second machine.

In the Microsoft Windows operating environment the specific calls for network OLE are as given below, and are listed in FIGS. 3 and 4, although it should be noted that the invention is not limited to this operating system. CLIP SEND becomes a viewer of CLIPBOARD A using SetClipboardViewer (step 310), and APPN A inserts data onto CLIPBOARD A using SetClipboardData (step 320). This causes a notification WM_DRAWCLIPBOARD to be sent to CLIP SEND (step 330). CLIP SEND interrogates CLIPBOARD A using EnumClipboardFormats (step 340) to obtain the list of formats in which the data on the clipboard is available. It passes this list to the remote terminal B using standard messaging software (step 350). CLIP RECEIVE then uses the call SetClipboardOwner to become the owner of CLIPBOARD B (step 360). The formats are then inserted onto CLIPBOARD B (step 370) using the delayed rendering option in SetClipboardData, and become available for user selection.

The various clipboard formats are now available from within APPN B. One of these formats is recognised by APPN B as corresponding to OLE (Object Embedding). For the purpose of the present invention we assume that the user at terminal B selects Object Embedding (the processing associated with other possible selections is described in the afore-mentioned applications U.S. application Ser. Nos. 08/149,487 and 08/203,067.

The processing involved with satisfying the OLE request is illustrated in FIG. 4. Initially the user selects the clipboard entry corresponding to Object Embedding, either implicitly or explicitly, resulting in a GetClipboardData call from APPN B to CLIPBOARD B (step 410). Since all the formats are inserted onto CLIPBOARD B using delayed rendering (to save the bandwidth of transmitting formats which are never required) the operating system passes the clipboard request back to CLIP RECEIVE, the origin of the clipboard entry, using WM_RENDERFORMAT (step 420). This request is converted into a message sent from CLIP RECEIVE to CLIP SEND (step 430). CLIP SEND now interrogates the corresponding entry on CLIPBOARD A, using GetClipboardData (step 440) which will produce the data string corresponding to "Application.Topic.Item.." (this may be directly available from the clipboard, or provided by APPN A using delayed rendering: step 450). CLIP SEND then sends a message containing this data string across to CLIP RECEIVE (step 460). Once it has received the requested data, CLIP RECEIVE passes the data to CLIPBOARD B (step 470), thereby satisfying the delayed rendering request, and CLIPBOARD B forwards the data to APPN B (step 480).

As explained above, in object embedding effectively three formats are taken simultaneously from the clipboard, corresponding to the name of the source application, the material in a "presentation format", and the data in a format native to the server application. Thus the steps of FIG. 4 are in fact essentially repeated for each of these three formats. The end result is that the client application receives sufficient information to allow it to successfully embed the object.

Once the object has been embedded in APPN B, it is no different from an object that has been embedded from a local application (ie one running on the same machine as APPN B). Thus double clicking on the object from within APPN B will result in a call to the operating system at machine B and an attempt to launch an application having the same name at APPN A at machine B. Clearly if there is no such application at machine B, this will result in an error, but providing that the requisite application is available, it will be launched to process the object in accordance with OLE using conventional operating system facilities. It is conceivable that a different: implementation might be adopted, whereby double clicking on the object does in fact result in the launch of the application at the server node, perhaps using an intermediary on the client node to intercept the operating system OLE messages and forward them to the server node.

The convention under Microsoft Windows is for Object Embedding to be designated on the clipboard by a private format of "OwnerLink", and the associated data is represented by "ApplicationName.Topic.Item..", although for Object Embedding only the Application Name is actually used directly (to invoke the originating application); the other two components could in theory be used for any parameters. Note that it might also be possible for P2P-B to change the application name if an intermediary was being used to remotely launch an application as suggested above. The private format containing the data in a form that can be processed by the server application is conventionally designated "Native" in Microsoft Windows applications.

In a simple system it might be desired just to transmit the "OwnerLink" and "Native" formats, plus a suitable presentation format, from the server machine to the client (ie to remove all the other clipboard formats). However, the currently implemented system in fact transmits all the available clipboard formats, thereby allowing general clipboard transfers over the network. Apart from the formats representing Object Embedding and standard clipboard transfer, a couple of other private formats are worthy of remark. In Microsoft Windows applications, the private format "Link" is used to indicate DDE. This can be handled in the same way as other formats, except that the Application Name in the associated data is changed by CLIP RECEIVE by appending the original Application Name to "P2P" (between steps 460 and 470 on FIG. 4). This allows P2P-B to recognise the subsequent request for DDE at machine B, and act as an intermediary between APPN A and APPN B (see UK 9322587.8 for more details).

Another special private format is "ObjectLink", which conventionally is used by Microsoft Windows applications to denote Object Linking. The current implementation does not support Object Linking, because of difficulties in resolving the reference to the object which actually resides on another machine (again it may be possible to overcome this by using an intermediary on the client machine). Thus in some ways it would be desirable to delete "ObjectLink" from the list of available formats, so that it does not appear on the client machine as an available option. However, it has been found that some Microsoft Windows applications do not in fact adhere to the above naming convention, and rather treat "ObjectLink" as denoting DDE. Therefore it has been decided to process "ObjectLink" in the same way as "Link" (ie with the application name changed) to ensure correct DDE support. Clearly, it might be desirable to develop a list of which applications use "ObjectLink" to denote Object Linking, and which to denote DDE, and then process accordingly, although this would not assist with handling applications not previously encountered.

It should be appreciated that "Ownerlink", "Native" etc are simply conventional names and are not important per se. Any group of applications may chose to adopt a different set of names for OLE, although of course such names would not be compatible with existing Microsoft Windows applications that support OLE.

Note that although the description has concentrated on one machine acting as a server, and one as a client, in practice each machine would have the capability to function as either the source or target (or both) of such OLE transfers. Note also that although the description has referred primarily to the use of the Microsoft Windows operating system, the invention is applicable to any operating system which supports OLE (although obviously different naming conventions might be employed). If OLE is to be performed between machines running different operating systems, then some conversion between the different clipboard formats may be required (see afore-mentioned application U.S. application Ser. No. 08/203,067 more details).

What is claimed is:

1. A method of providing object linking and embedding (OLE) over a computer network, in which an object generated by an arbitrary first application at a first computer in the network may be incorporated into an arbitrary second application at a second computer in the network, said first and second computers each running a stand-alone operating system supporting a clipboard, the method comprising the steps of:

receiving notification that the first application has submitted material to the clipboard on the first computer and obtaining a list of available formats for said submitted material;

transmitting the format(s) corresponding to Object Embedding to the second computer;

submitting the format(s) corresponding to Object Embedding to the clipboard at the second computer for selection by the second application.

2. The method of claim 1, wherein the list of all the available formats for the material submitted to the clipboard is transmitted to the second computer for submission to the clipboard at the second computer.

3. The method of claim 2, further comprising the step of detecting if one of the available formats corresponds to Object Linking, and if so, not submitting this to the clipboard at the second computer.

4. The method of claim 2 or 3, further comprising the step of detecting if one of the available formats corresponds to dynamic data exchange (DDE), and if so, changing the data associated with this by replacing the application name therein with a name containing an identifier of the first computer.

5. The method of claim 1, 2 or 3, wherein formats are submitted to the clipboard on the second computer using delayed rendering, and further comprising the steps of:

responsive to receiving a request from the second application for a copy of the clipboard material in a particular format, sending a corresponding request to the first computer;

obtaining the requested material from the clipboard at the first computer;

transmitting the requested material obtained from the clipboard on the first computer to the second computer;

and submitting the requested material to the clipboard on the second computer, for passing to the second application.

6. The method of claim 1, 2 or 3, wherein both first and second computers run conferencing applications, which are responsible for exchanging messages between the first and second computer.

7. The method of claim 4, wherein formats are submitted to the clipboard on the second computer using delayed rendering, and further comprising the steps of:

responsive to receiving a request from the second application for a copy of the clipboard material in a particular format, sending a corresponding request to the first computer;

obtaining the requested material from the clipboard at the first computer;

transmitting the requested material obtained from the clipboard on the first computer to the second computer;

and submitting the requested material to the clipboard on the second computer, for passing to the second application.

8. The method of claim 4 wherein, both first and second computers run conferencing applications, which are responsible for exchanging messages between the first and second computer.

9. The method of claim 5 wherein, both first and second computers run conferencing applications, which are responsible for exchanging messages between the first and second computer.

10. The method of claim 7 wherein, both first and second computers run conferencing applications, which are responsible for exchanging messages between the first and second computer.

* * * * *